W. S. SHIFFER AND V. L. ZWALLY.
SLED BRAKE.
APPLICATION FILED AUG. 5, 1920.
1,429,648.
Patented Sept. 19, 1922.
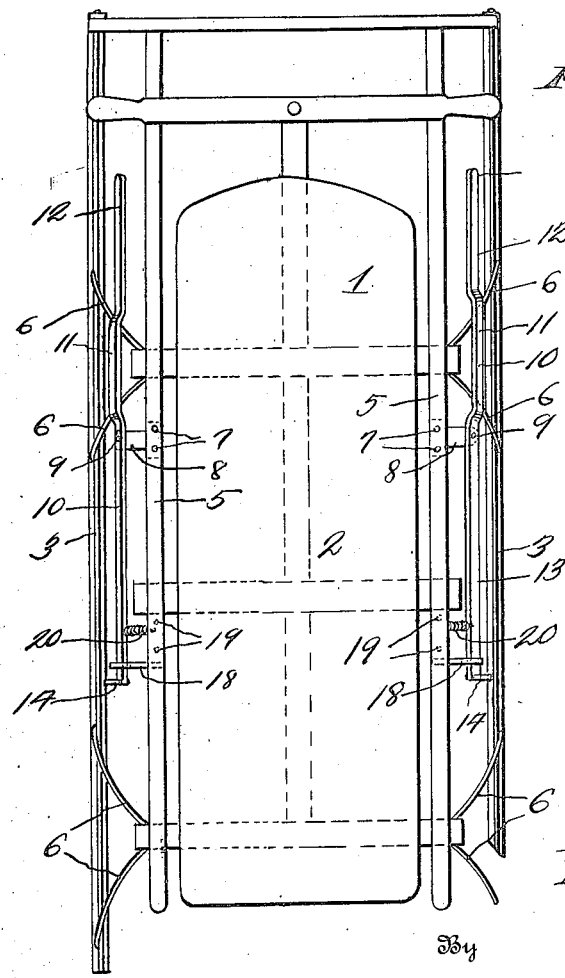

Patented Sept. 19, 1922.

1,429,648

UNITED STATES PATENT OFFICE.

WILLIAM S. SHIFFER AND VICTOR L. ZWALLY, OF LANCASTER, PENNSYLVANIA.

SLED BRAKE.

Application filed August 5, 1920. Serial No. 401,368.

*To all whom it may concern:*

Be it known that we, WILLIAM S. SHIFFER and VICTOR L. ZWALLY, citizens of the United States, residing at Lancaster, in the county of Lancaster, State of Pennsylvania, have invented a new and useful Sled Brake; and we do hereby declare the following to be a full, clear, and exact description of the invention, such as will enable others skilled in the art to which it appertains to make and use the same.

The invention relates to sled brakes and guiders therefor, and has for its object to provide a device of this character comprising pivoted levers pivoted to each side of the sled, one end of each lever being provided with a bifurcation adapted to receive the runner and the arms of the bifurcations being adapted to be forced into engagement with the ground for guiding the sleigh, from one side to the other, when it is desired to make a turn and both bifurcated ends of the levers when forced simultaneously into engagement with the ground, forming means for breaking the momentum of the sleigh. Also to provide spring means for normally holding the ground engaging ends of the levers out of engagement with the ground.

A further object is to provide guide means for guiding the ground engaging ends during their downward and upward movement and to so dispose the handle ends of the levers, that they will be adjacent the operator's hand and within easy reach.

With the above and other objects in view the invention resides in the combination and arrangement of parts as hereinafter set forth shown in the drawings, described and claimed it being understood that changes in the precise embodiment of the invention may be made within the scope of what is claimed without departing from the spirit of the invention.

In the drawings:—

Figure 1 is a side elevation of a conventional form of sled showing the guider and brake applied thereto.

Figure 2 is a top plan view of a conventional form of sled showing the guiding and braking levers applied to each side thereof.

Figure 3 is a perspective view of the bifurcated ends of one of the levers.

Figure 4 is a perspective view of the guide bracket for one of the levers.

Referring to the drawings, the numeral 1 designates a conventional form of sled, which comprises the platform 2 and runners 3. Secured to the under face of the longitudinally disposed bars 5 are downwardly extending brackets 6, which have their lower ends secured to the runners 3, thereby supporting the platform 2 and forming a rigid sled structure. Secured to each bar 5 as at 7 are downwardly extending brackets 8, on the lower end of which are pivoted as at 9 guiding and braking levers 10. The levers 10 are arched as at 11 so as to clear the outwardly and downwardly extending brackets 6 and are provided with hand engaging portions 12, located adjacent the forward end of the sled and within easy reach of the operator's hand so that they may be rocked on their pivotal points as desired. The rearwardly extending arms 13 of the pivoted levers 10 are provided with downwardly extending arms 14, the lower ends of which are bifurcated as at 15. Bifurcations 15 when forced downwardly receive the runners 3 so that the ground engaging points 16 may be forced into engagement with the ground on each side of the runners. During the downward and upward movement of the arms 13, the arms 13 are guided in the slots 17 of brackets 18 which are secured to the under faces of the bars 5 as at 19. A coiled spring 20 has one of its ends connected to the arm 13 of each lever 10 and its other end connected to the under face of the bar 4. The coiled springs 20 forming means for holding the arms 13 upwardly and the ground engaging members out of engagement with the ground.

From the above it will be seen that braking and guiding devices are provided for sleds which may be quickly and easily applied to any form of sled and it will also be seen that during a guiding operation the operator may force one or the other of the ground engaging members into engagement with the ground, thereby causing the sled to turn at the option of the operator and in any direction he desires. It will also be seen that if both ground engaging elements are forced into engagement with the ground at the same time the momentum of the sled may be broken and the sled stopped.

It is to be understood that the device may be applied to any conventional form of sled and the brackets varied in shape according to the type of sled to which the device is being applied. Also that the bent portions 11 of the levers may be eliminated if so desired in designs of sleds where it is not necessary to arch runner brackets.

The invention having been set forth what is claimed as new and useful is:—

1. The combination with a sled, of pivoted levers pivoted to each side of the sled, the rear ends of the pivoted levers being provided with downwardly extending arms, the lower ends of said downwardly extending arms being provided with bifurcations adapted to receive the sled runners, the arms of the bifurcations forming ground engaging elements disposed on each side of the runners, a guide bracket for guiding the rear ends of each of the pivoted levers in its downward and upward movement, coiled springs connected to the rear ends of the levers and to the sled for normally holding the ground engaging elements in their upward positions, the forward ends of the levers being provided with offset portions and hand engaging members, said offset portions arching the runner brackets, said hand engaging portions of the levers being disposed adjacent the forward end of the sled and within reach of the operator where they can be singly or simultaneously moved.

2. The combination with a sled comprising a body, downwardly and outwardly extending runner brackets carried by said body and having their lower ends secured to runners, of a brake for said sled, said brake comprising a lever pivoted to a downwardly and outwardly extending bracket carried by the body, said lever being movable in a downwardly and outwardly inclined plane, a ground engaging element carried by the rear end of said lever and provided with a bifurcation positioned to receive the runner during a braking operation, the handle end of said lever being disposed adjacent the forward end of the sled and an offset portion carried by said lever adjacent its forward end and arching one of the downwardly and outwardly extending brackets.

In testimony whereof we have signed our names to this specification in the presence of two subscribing witnesses.

WILLIAM S. SHIFFER.
VICTOR L. ZWALLY.

Witnesses:
CHAS. S. MARTIN.
G. EARL WARFEL.